United States Patent
Gong

(10) Patent No.: US 12,380,017 B2
(45) Date of Patent: Aug. 5, 2025

(54) METHOD, APPARATUS AND DEVICE FOR SOFTWARE TESTING, AND COMPUTER-READABLE STORAGE MEDIUM

(71) Applicant: Hefei Suneco Technology Co., Ltd., Hefei (CN)

(72) Inventor: Cunhao Gong, Hefei (CN)

(73) Assignee: Hefei Suneco Technology Co., Ltd., Hefei (CN)

(*) Notice: Subject to any disclaimer, the term of this patent is extended or adjusted under 35 U.S.C. 154(b) by 118 days.

(21) Appl. No.: 18/170,010

(22) Filed: Feb. 16, 2023

(65) Prior Publication Data
US 2023/0350794 A1 Nov. 2, 2023

(30) Foreign Application Priority Data
Apr. 2, 2022 (CN) .......................... 202210344223.4

(51) Int. Cl.
*G06F 11/3668* (2025.01)
*G06F 9/50* (2006.01)

(52) U.S. Cl.
CPC ............ *G06F 11/3688* (2013.01); *G06F 9/50* (2013.01); *G06F 11/3676* (2013.01)

(58) Field of Classification Search
None
See application file for complete search history.

(56) References Cited

U.S. PATENT DOCUMENTS

| 6,249,882 | B1 | 6/2001 | Testardi | |
|---|---|---|---|---|
| 8,914,675 | B2* | 12/2014 | Hatano | G06F 11/263 717/124 |
| 2010/0146514 | A1* | 6/2010 | Alexander | G06F 9/5083 718/104 |
| 2012/0054756 | A1* | 3/2012 | Arnold | G06F 9/4881 718/102 |

(Continued)

FOREIGN PATENT DOCUMENTS

| CN | 100498735 C | 6/2009 |
|---|---|---|
| CN | 103391225 B | 9/2016 |

OTHER PUBLICATIONS

First Examination Report for Australian Patent Application No. 2023200878, dated Jan. 30, 2024.

*Primary Examiner* — Jason D Mitchell
(74) *Attorney, Agent, or Firm* — Wolf, Greenfield & Sacks, P.C.

(57) ABSTRACT

A method, an apparatus and a device for software testing, and a computer-readable storage medium are provided. The method includes: acquiring a first test case set for to-be-tested software, and dividing the first test case set into multiple first test sequences; loading, for each of the multiple first test sequences, a test case from the first test sequence to a test unit corresponding to the first test sequence at the beginning of the software testing, to execute test cases by multiple test units in parallel; and during the software testing, acquiring test progress information of the multiple first test sequences, and distributing outstanding test cases in the multiple first test sequences based on the acquired test progress information to modify the numbers of test cases in the respective first test sequences. The outstanding test case is a test case to be loaded into a corresponding test unit for execution.

16 Claims, 3 Drawing Sheets

(56) References Cited

U.S. PATENT DOCUMENTS

| | | | |
|---|---|---|---|
| 2012/0324449 A1* | 12/2012 | Huetter | G06F 9/5066 |
| | | | 718/1 |
| 2013/0117611 A1* | 5/2013 | Chakraborty | G06F 11/3688 |
| | | | 714/33 |
| 2015/0234733 A1 | 8/2015 | Cai et al. | |
| 2017/0351549 A1* | 12/2017 | Burke | G06F 9/5088 |
| 2019/0129833 A1 | 5/2019 | Lv et al. | |
| 2019/0163618 A1* | 5/2019 | Akiona | G06Q 10/06 |
| 2023/0259186 A1* | 8/2023 | Guan | G06F 1/26 |
| | | | 713/300 |

\* cited by examiner

METHOD, APPARATUS AND DEVICE FOR SOFTWARE TESTING, AND COMPUTER-READABLE STORAGE MEDIUM

The application claims priority to Chinese Patent Application No. 202210344223.4, titled "METHOD, APPARATUS AND DEVICE FOR SOFTWARE TESTING, AND COMPUTER-READABLE STORAGE MEDIUM", filed on Apr. 2, 2022, with the China National Intellectual Property Administration, which is incorporated herein by reference in its entirety.

FIELD

The present disclosure relates to the technical field of software, and in particular to a method, an apparatus and a device for software testing, and a computer-readable storage medium.

BACKGROUND

As software is increasingly feature-rich, the number of test cases for software testing is increasing. For example, the introduction of the ISO26262 functional safety protocol in the automotive field has led to a significant increase in the amount of code for a controller, which directly results in the increasingly high requirements for software testing of the controller. Correspondingly, the number of test cases for software testing is increasing, from hundreds to thousands or even tens of thousands.

In existing software testing, test cases are executed serially because the test cases are in the hundreds. However, as the number of test cases grows exponentially, executing test cases serially may cause the time spent on testing to increase exponentially, resulting in an extremely long time spent on executing the test cases for a single round.

SUMMARY

A method, an apparatus and a device for software testing, and a computer-readable storage medium are provided according to the present disclosure, to execute test cases in parallel, so as solve the problem of inefficiency resulted from the extremely long time spent on serially executing test cases in a single round.

To solve this problem, a method for software testing is provided according to the present disclosure. The method includes: acquiring a first test case set for to-be-tested software, and dividing the first test case set into multiple first test sequences; loading, for each of the multiple first test sequences, a test case from the first test sequence to a test unit corresponding to the first test sequence at the beginning of the software testing, to execute the loaded test cases by multiple test units in parallel; and during the software testing, acquiring test progress information of the multiple first test sequences, and distributing outstanding test cases in the multiple first test sequences based on the acquired test progress information to modify the numbers of test cases in the respective first test sequences, wherein the outstanding test case is a test case to be loaded into a corresponding test unit for execution.

In an embodiment, for a target test sequence among the multiple first test sequences, the loading a test case from the target test sequence into a target test unit corresponding to the target test sequence includes: acquiring a test result of the target test unit after one test case from the target test sequence is loaded into the target test unit each time; and loading the test case among outstanding test cases from the target test sequence into the target test unit.

In an embodiment, the distributing outstanding test cases in the multiple first test sequences based on the acquired test progress information includes: determining, based on the test progress information, whether there is a completed sequence among the multiple first test sequences, where the number of outstanding test cases in the completed sequence is zero; and allocating, if it is determined that there is a completed sequence, a first preset number of outstanding test cases from an uncompleted sequence among the multiple first test sequences to the completed sequence, where the number of outstanding test cases in the uncompleted sequence is greater than a second preset number.

In an embodiment, the method further includes: after the loading, for each of the multiple first test sequences, a test case from the first test sequence to a test unit corresponding to the first test sequence at the beginning of the software testing, to execute the loaded test cases by multiple test units in parallel, acquiring a second test case set for performing a second round of testing on the to-be-tested software after finishing a first round of testing on the to-be-tested software based on the first test case set; acquiring, for each of the multiple test units, a case list of test cases executed by the test unit after finishing the first round of testing on the to-be-tested software based on the first test case set; dividing the second test case set based on the multiple case lists to obtain multiple second test sequences; and loading, for each of the multiple second test sequences, a test case from the second test sequence to the test unit corresponding to the second test sequence at the beginning of the second round of testing, to execute the loaded test cases by the multiple test units in parallel.

In an embodiment, the dividing the second test case set based on the multiple case lists to obtain multiple second test sequences includes: in a case that the second test case set is equal to the first test case set, allocating based on the multiple case lists and from the second test case set, test cases executed by a same test unit to a same test sequence, to obtain the multiple second test sequences.

In an embodiment, the dividing the second test case set based on the multiple case lists to obtain multiple second test sequences includes: in a case that there are test cases in the second test case set and not in the first test case set, allocating, based on the multiple case lists and from the second test case set, test cases executed by a same test unit to a same test sequence, to obtain the multiple second test sequences corresponding to the multiple test units; and distributing test cases in the second test case set and not in the first test case set among the multiple second test sequences.

In an embodiment, the method further includes: after the loading, for each of the multiple first test sequences, a test case from the first test sequence to a test unit corresponding to the first test sequence at the beginning of the software testing, to execute the loaded test cases by multiple test units in parallel, acquiring a second test case set for performing a second round of testing on the to-be-tested software after finishing a first round of testing on the to-be-tested software based on the first test case set; acquiring an intersection of the second test case set and the first test case set, and acquiring a first total period of time spent on executing all test cases in the intersection in the first round of testing; dividing the intersection based on the first total period of time to obtain multiple second test sequences, wherein among the multiple second test sequences, a second total period of time spent on executing all test cases in one second test sequence is equal to another second total period of time spent on executing all test cases in another second test sequence; and distributing test cases in the second test case set and not in the first test case set among the multiple second test sequences.

In an embodiment, the dividing the first test case set into multiple first test sequences includes: acquiring the number of the multiple test units; and dividing the first test case set into the multiple first test sequences, wherein the number of the multiple first test sequences is equal to the number of the multiple test units.

In an embodiment, the method further includes: before the loading, for each of the multiple first test sequences, a test case from the first test sequence to a test unit corresponding to the first test sequence, determining different CPUs or different cores of a same CPU in a server as the multiple test units in response to success in connecting to the server; and determining different CPUs or different cores of a same local CPU as the multiple test units in response to failure in connecting the server.

In order to solve the above problem, an apparatus for software testing is provided according to the present disclosure. The apparatus for software testing includes a first distribution module, a test module and a second distribution module. The first distribution module is configured to acquire a first test case set for to-be-tested software, and divide the first test case set into multiple first test sequences. The test module is configured to load, for each of the multiple first test sequences, a test case from the first test sequence to a test unit corresponding to the first test sequence at the beginning of the software testing, to execute the loaded test cases by multiple test units in parallel. The second distribution module is configured to, during the software testing, acquire test progress information of the multiple first test sequences, and distributing outstanding test cases in the multiple first test sequences based on the acquired test progress information to modify the numbers of test cases in the respective first test sequences, where the outstanding test case is a test case to be loaded into a corresponding test unit for execution.

In order to solve the above problem, a device for software testing is provided according to the present disclosure. The device for software testing includes a memory, a processor, and a software testing program stored on the memory and executable by the processor. The software testing program, when executed by the processor, implements the method for software testing.

In addition, a computer-readable storage medium is provided according to the present disclosure in order to solve the above problem. The computer-readable storage medium stores a software testing program that, when executed by a processor, implements the method for software testing.

According to the present disclosure, the first test case set for the to-be-tested software is acquired, and is divided into the multiple first test sequences. For each of the multiple first test sequences, a test case in the first test sequence is loaded into the test unit corresponding to the first test sequence at the beginning of the software testing, so that the test units execute test cases from the respective first test sequences in parallel. During the software testing, test progress information of the multiple first test sequences is acquired, and outstanding test cases in the multiple first test sequences are distributed based on the test progress information so as to modify the numbers of test cases included in the respective first test sequences. Therefore, the test cases of the to-be-tested software are executed in parallel, so that the testing efficiency is improved compared to the test cases of the to-be-tested software being executed serially. In addition, the number of test cases in each of the test sequences is modified based on the test progress of the test sequence during the testing, so that all the test sequences can be finished executing at the same time, thereby maximizing resources of the test units and maximizing the testing efficiency.

The implementation of objects, functional features and advantages of the present disclosure are further described by embodiments with reference to the drawings.

DETAILED DESCRIPTION OF EMBODIMENTS

It should be understood that the embodiments described herein are merely for explaining rather than limiting the present disclosure.

Figure 1:
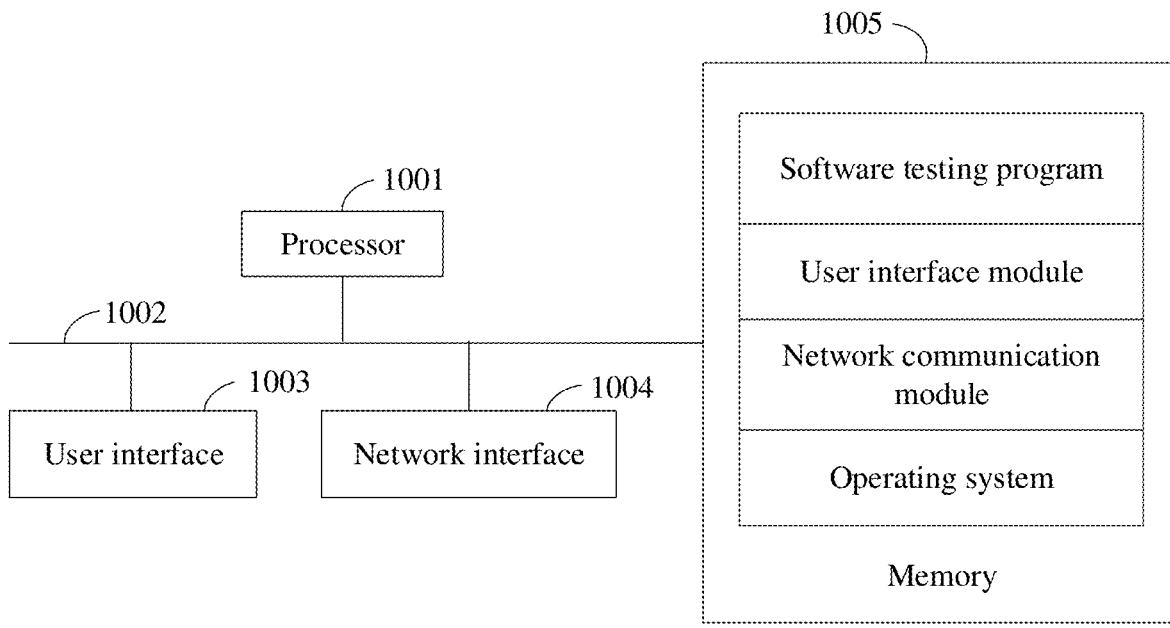
FIG. 1 is a schematic structural diagram illustrating a runtime system in hardware involved in technical solutions according to an embodiment of the present disclosure.

Reference is made to FIG. 1, which is a schematic structural diagram illustrating a runtime system in hardware involved in technical solutions according to an embodiment of the present disclosure.

It should be noted that, a device for software testing according to embodiments of the present disclosure may be a smart phone, a personal computer, a server and the like, which is not limited herein.

As shown in FIG. 1, the device for software testing may include: a processor 1001, for example, a central processing unit (CPU); a network interface 1004; a user interface 1003; a memory 1005; and a communication bus 1002. The processor 1001, the network interface 1004, the user interface 1003 and the memory 1005 communicate with each other via the communication bus 1002. The user interface 1003 may include a display, an input unit, for example, a keyboard, and optionally includes a universal wired or wireless interface. The network interface 1004 may optionally include a universal wired or wireless interface (for example, a WI-FI interface). The memory 1005 may be a high-speed random-access memory (RAM), or a non-volatile memory, for example, a disk memory. Alternatively, the memory 1005 is a storage device independent of the processor 1001.

Those skilled in the art should understand that the structure shown in FIG. 1 does not constitute a limitation on the device for software testing. The device for software testing may include more or less components than that shown in the drawings. Alternatively, some components of the device for software testing may be combined. Alternatively, components of the device for software testing may be arranged differently.

As shown in FIG. 1, the memory 1005, as a computer storage medium, may include an operating system, a network communication module, a user interface module, and a software testing program. The operating system is a program that manages and controls hardware and software resources on a device and supports operations of the software testing program and other software or program. In the device shown in FIG. 1, the user interface 1003 is configured to perform data communication with a client terminal. The network interface 1004 is configured to establish a communication connection with the server. The processor 1001 is configured to invoke the software testing program stored in the memory 1005 to perform operations of:

acquiring a first test case set for to-be-tested software, and dividing the first test case set into multiple first test sequences;

loading, for each of the multiple first test sequences, a test case from the first test sequence to a test unit corresponding to the first test sequence at the beginning of the software testing, to execute the loaded test cases by multiple test units in parallel; and during the software testing, acquiring test progress information of the multiple first test sequences, and distributing outstanding test cases in the multiple first test sequences based on the acquired test progress information to modify the numbers of test cases in the respective first test sequences, where the outstanding test case is a test case to be loaded into a corresponding test unit for execution.

Further, for a target test sequence among the multiple first test sequences, the loading a test case from the target test sequence into a target test unit corresponding to the target test sequence includes:

acquiring a test result of the target test unit after one test case from the target test sequence is loaded into the target test unit each time; and loading a test case among outstanding test cases from the target test sequence into the target test unit.

Further, the distributing outstanding test cases in the multiple first test sequences based on the acquired test progress information includes:

determining, based on the test progress information, whether there is a completed sequence among the multiple first test sequences, where the number of outstanding test cases in the completed sequence is zero; and allocating, if it is determined that there is a completed sequence, a first preset number of outstanding test cases from an uncompleted sequence among the multiple first test sequences to the completed sequence, where the number of outstanding test cases in the uncompleted sequence is greater than a second preset number.

Further, after the loading, for each of the multiple first test sequences, a test case from the first test sequence to a test unit corresponding to the first test sequence at the beginning of the software testing, to execute test cases by multiple test units in parallel, the processor 1001 is further configured to invoke the software testing program stored in the memory 1005 to perform operations of:

acquiring a second test case set for performing a second round of testing on the to-be-tested software after finishing a first round of testing on the to-be-tested software based on the first test case set;

acquiring, for each of the multiple test units, a case list of test cases executed by the test unit after finishing the first round of testing on the to-be-tested software based on the first test case set;

dividing the second test case set based on the multiple case lists to obtain multiple second test sequences; and loading, for each of the multiple second test sequences, a test case from the second test sequence to the test unit corresponding to the second test sequence at the beginning of the second round of testing, to execute the loaded test cases by the multiple test units in parallel.

Further, the dividing the second test case set based on the multiple case lists to obtain multiple second test sequences includes: in a case that the second test case set is equal to the first test case set, allocating, based on the multiple case lists and from the second test case set, test cases executed by a same test unit to a same test sequence, to obtain the multiple second test sequences.

Further, the dividing the second test case set based on the multiple case lists to obtain multiple second test sequences includes: in a case that there are test cases in the second test case set and not in the first test case set, allocating, based on the multiple case lists and from the second test case set, test cases executed by a same test unit to a same test sequence, to obtain the multiple second test sequences corresponding to the multiple test units; and distributing test cases in the second test case set and not in the first test case set among the multiple second test sequences.

Further, after the loading test cases from the multiple first test sequences to test units respectively at the beginning of the software testing, to execute the test cases by the respective test units in parallel, the processor 1001 is further configured to invoke the software testing program stored in the memory 1005 to perform operations of:

acquiring a second test case set for performing a second round of testing on the to-be-tested software after finishing a first round of testing on the to-be-tested software based on the first test case set;

acquiring an intersection of the second test case set and the first test case set, and acquiring a first total period of time spent on executing all test cases in the intersection in the first round of testing;

dividing the intersection based on the first total period of time to obtain multiple second test sequences, where among the multiple second test sequences, a second total period of time spent on executing all test cases in one second test sequence is equal to another second total period of time spent on executing all test cases in another second test sequence; and distributing test cases in the second test case set and not in the first test case set among the multiple second test sequences.

Further, the dividing the first test case set into multiple first test sequences includes: acquiring the number of the multiple test units; and dividing the first test case set into the multiple first test sequences, where the number of the multiple first test sequences is equal to the number of the multiple test units.

Further, before the loading, for each of the multiple first test sequences, a test case from the first test sequence to a test unit corresponding to the first test sequence, the processor 1001 is further configured to invoke the software testing program stored in the memory 1005 to perform operations of:

determining different CPUs or different cores of a same CPU in a server as the multiple test units in response to success in connecting to the server; and determining different CPUs or different cores of a same local CPU as the multiple test units in response to failure in connecting to the server.

Based on the above structure, embodiments of the method for software testing are proposed.

Figure 2:
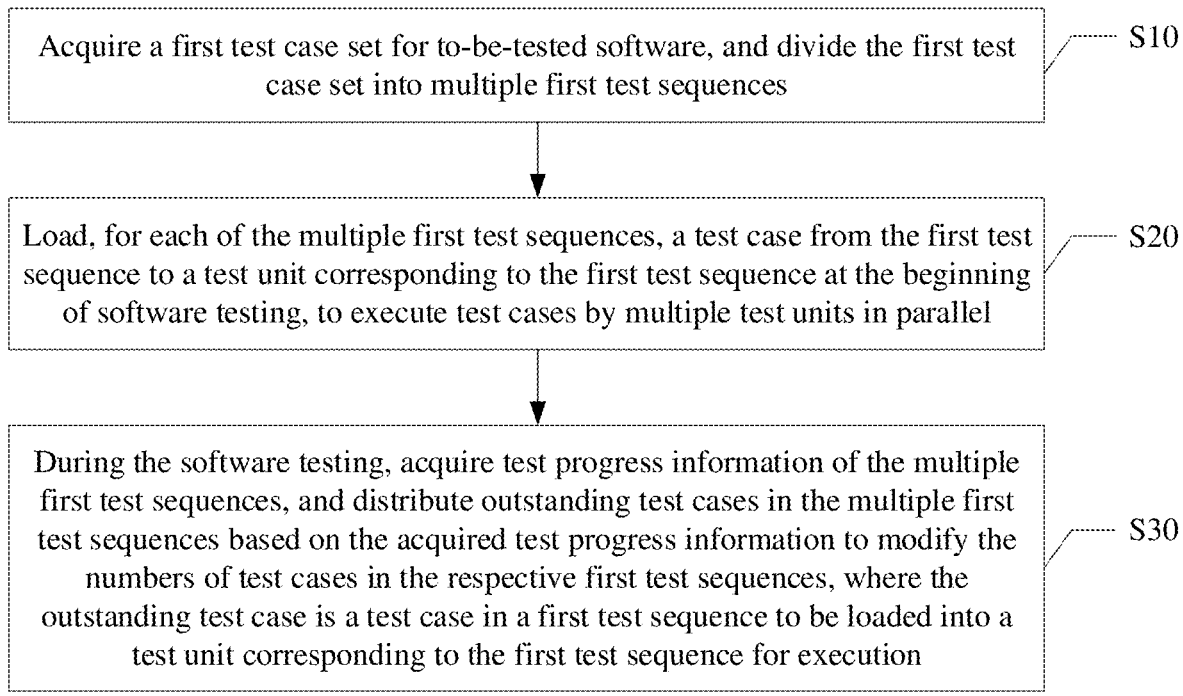
FIG. 2 is a schematic flow chart illustrating a method for software testing according to a first embodiment of the present disclosure.

Reference is made to FIG. 2, which is a schematic flow chart illustrating the method for software testing according to a first embodiment of the present disclosure.

Embodiments of the method for software testing are provided herein. It should be noted that although steps are described or shown in logic order in the flow chart, the steps may be performed in a different order in some cases. In the first embodiment, the method for software testing may be performed by devices such as a personal computer and a smart phone, which are not limited herein. For the convenience of description, the method for software testing performed by a test device is illustrated in the following embodiments. The method for software testing according to the first embodiment includes the following steps S10 to S30.

In step S10, a first test case set for to-be-tested software is acquired, and is divided into multiple first test sequences.

The to-be-tested software refers to software that needs testing. There is no restriction as to which software is to be tested, for example, the to-be-tested software may be software deployed in a vehicle controller. A test case refers to executable codes for testing functionality of the software. In this embodiment, test cases are independent of each other, that is, may be executed separately. Test cases may be prepared before testing the to-be-tested software. A collection of test cases is called a test case set (hereinafter referred to as a first test case set). The first test case set may be edited by a tester and uploaded to the test device.

After acquiring the first test case set for the to-be-tested software, the test device divides the first test case set into multiple test sequences (hereinafter referred to as first test sequences). Each of the multiple first test sequence includes at least one test case. There is no restriction as to division of the first test case set herein. For example, the test cases may be divided equally after the number of first test sequences is determined, so that all the first sequences include the same number of test cases.

In step S20, for each of the multiple first test sequences, a test case is loaded from the first test sequence to a test unit corresponding to the first test sequence at the beginning of the software testing, so that the loaded test cases are executed by respective test units in parallel.

The test device starts the software testing after acquiring the first test sequences by division. At the beginning of the software testing, test cases from the test sequences are loaded into test units, respectively. A test unit is a hardware unit capable of executing test cases. The test units may perform the testing in parallel. Different CPUs may serve as the test units, or different cores of a CPU may serve as the test units, which is not limited herein. In order to load the test cases from first test sequences into test units, the number of test units may be greater than or equal to the number of first test sequences according to this embodiment. That is, the first test case set may be divided based on the number of test units, so that the number of first test sequences is less than or equal to the number of test units, which is not limited herein. It should be understood that with two or more first test sequences, improvements in testing efficiency are significant compared to testing in serial.

The test device may match the first test sequences to respective test units, to load test cases from the test sequences into the respective test units for execution, such that the test units execute the test cases from the first test sequences in parallel. For example, for n first test sequences, the test device loads test cases from the 1st first test sequence to a first test unit sequentially so that the first test unit executes the test cases from the 1st first test sequence sequentially, loads test cases from the 2nd first test sequence to a second test unit sequentially so that the second test unit executes the test cases from the 2nd first test sequence sequentially, . . . , until the test device loads test cases from the nth first test sequence to an nth test unit sequentially so that the nth test unit executes the test cases from the nth first test sequence sequentially. Therefore, the n test units execute test cases from the n first test sequences in parallel.

In step S30, during the software testing, test progress information of the multiple first test sequences is acquired, and outstanding test cases in the multiple first test sequences are distributed based on the test progress information so as to modify the numbers of test cases included in the respective first test sequences. The outstanding test case is a test case to be loaded into a corresponding test unit for execution.

It should be noted that for each of the multiple first test sequences, the test device loads part of test cases from the first test sequence into the test unit corresponding to the first test sequence for execution and then modifies the number of test cases in the first test sequence in real time based on the test progress of the first test sequence during the software testing, rather than loads all the test cases from the first test sequence into the test unit simultaneously. In this way, all the multiple first test sequences are finished executing at the same time, so as to maximize resources of the test units and maximize the testing efficiency.

During the software testing, the test device acquires, for each of the multiple first test sequences, test progress information of the first test sequence. The test progress information may reflect a progress of execution of test cases in the first test sequence. For example, the test progress information may be the number of outstanding test cases in the first test sequence. Alternatively, the test progress information may be a ratio of the number of outstanding test cases in the first test sequence to the number of all test cases in the first test sequence. The test device may acquire the test progress information of the first test sequence in real time or at intervals, which is not limited herein. In a case that the test device acquires the test progress information at intervals, the interval may be set relatively small in order to improve the testing efficiency.

In this embodiment, after acquiring the test progress information of all the first test sequences, the test device distributes outstanding test cases, which have not been loaded into respective test units, in all the first test sequences based on the acquired test progress information for the purpose of finishing executing all the multiple first test sequences by the respective test units at the same time. In practice, this purpose may be achieved in various manners, which are not limited herein.

In an embodiment, for each of the multiple first test sequences, the number of outstanding test cases in the first test sequence is determined based on the test progress information, and test cases in a first test sequence including more outstanding test cases are allocated to a first test sequence including less outstanding test cases. Therefore, for all the multiple first test sequences, the numbers of outstanding test cases are equal or within a certain range (there may be a case where the number of all test cases in the test case set is not multiplied by the number of test units and thus fails to be divided equally) after the allocation. For example, the number of test cases in both a first test sequence A and a first test sequence B is 100 originally. Test progress information acquired at a time instant reflects that the number of outstanding test cases in the first test sequence A is 50 and the number of outstanding test cases in the first test sequence B is 70. It can be seen that the execution of the first test sequence A is faster than the execution of the first test sequence B. For the purpose of finishing executing test cases in the first test sequence A and test cases in the first test sequence B at the same time, 10 of the 70 outstanding test cases in the first test sequence B are allocated to the first test sequence A, so that the number of outstanding test cases in both the first test sequence A and the first test sequence B is 60. After the allocation, the number of test cases in the first test sequence A is changed from 100 to 110 and the number of test cases in the first test sequence B is changed from 100 to 90. During the software testing, the test device may further modify the number of outstanding test cases in both the first test sequence A and the first test sequence B based on the test progress information until the software testing ends, thereby finishing executing the test cases in the first test sequence A and the test cases in the first test sequence B at the same time.

In this embodiment, the first test case set for the to-be-tested software is acquired, and is divided into the multiple first test sequences. For each of the multiple first test sequences, a test case in the first test sequence is loaded into the test unit corresponding to the first test sequence at the beginning of the software testing, so that the test units execute test cases from the respective first test sequences in parallel. During the software testing, test progress information of the multiple first test sequences is acquired, and outstanding test cases in the multiple first test sequences are distributed based on the test progress information so as to modify the numbers of test cases included in the respective first test sequences. Therefore, the test cases of the to-be-tested software are executed in parallel, so that the testing efficiency is improved compared to the test cases of the to-be-tested software being executed serially. In addition, the number of test cases in each of the test sequences is modified based on the test progress of the test sequence during the testing, so that all the test sequences can be finished executing at the same time, thereby maximizing resources of the test units and maximizing the testing efficiency.

In an embodiment, the method for software testing further includes the following step a.

In step a, for each of the test units, a test result, obtained by the test unit executing a test case, fed from the test unit back is acquired and outputted.

The test unit executes the test case and obtains a test result. The test result may indicate whether the testing is finished properly. Details of the test result depend on the to-be-tested software and the test case, and thus are not limited herein. The test device may acquire test results for test cases fed by respective test units back and output the test results for the tester to view. The test results may be outputted to a display device for display, or a storage device for storage.

In an embodiment, the division of the first test case set into the multiple first test sequences in step S10 includes the following steps S101 to S102.

In step S101, the number of test units is acquired.

The test device may first acquire the number of the test units in order to divide the first test case set. In a case that the test units are implemented by different local CPUs, the test device detects the number of available local CPUs so as to acquire the number of test units. In a case that the test units are implemented by different cores of a local CPU, the test device detects the number of available cores of the local CPU so as to acquire the number of test units. Alternatively, in a case that the test units are implemented by different CPUs or different cores of a CPU in a server, the test device may acquire the number of available CPUs or the number of available cores of the CPU in the server after successfully establishing a connection with the server, so as to obtain the number of test units. The server may be a cloud server or other type of server, which is not limited herein.

In step S102, the first test case set is divided into multiple first test sequences. The number of the multiple first test sequences is equal to the number of test units.

The test device divides the first test case set into the multiple first test sequences, and the number of the first test sequences is equal to the number of test units, so that the first test sequences are in one to one correspondence to the test units. In this embodiment, the number of the first test sequences obtained from division is the same as the number of test units, so that test cases in the first test case set can be executed in parallel to the maximum extent with hardware resources of the test units. In addition, since the first test sequences are in one to one correspondence to the test units, the distribution of resources is relatively simple. Therefore, the software testing in which test cases are executed in parallel according to this embodiment is simple.

In an embodiment, the method further includes the following steps b to c before step S20.

In step b, different CPUs or different cores of a same CPU in a server are determined as the test units in response to success in connecting to the server.

When successfully connecting to the server, the test device determines different CPUs or different cores of the same CPU in the server as the test units, so as to execute test cases in parallel by the test units in the server, thereby reducing utilization of local hardware resources. In an embodiment, the test device attempts to establish a connection with the server by "handshake", and acquires, in response to its success in connecting to the server, information about available resources of the server. The information about available resources may include the number of available CPUs or the number of available cores of a CPU for software testing in the server.

In step c, different local CPUs or different cores of a same local CPU are determined as the test units in response to failure in connecting to the server.

In a case that the test device fails to establish a connection with the server, the test cases are executed in parallel by local resources of the test device, that is, different local CPUs or different cores of the same local CPU serve as the test units in order to guarantee normal operation of the software testing.

Further, a second embodiment of the method for software testing is proposed based on the first embodiment. In the second embodiment, for a target test sequence among the multiple first test sequences, the loading a test case from the target test sequence to a target test unit corresponding to the target test sequence in step S20 includes the following steps S201 to S202.

In Step S201, a test result of the target test unit is acquired after one test case from the target test sequence is loaded into the target test unit each time.

In this embodiment, the loading of test case from one first test sequence, which is referred to as the target test sequence for ease of description, into the test unit for execution is illustrated. The test unit corresponding to the target test sequence is referred to as the target test unit.

The test device loads one test case from the target test sequence to the target test unit at a time, and then waits for the test result from the target test unit. The target test unit executes the test case and feeds the test result back to the test device.

In step S202, after the test result from the target test unit is acquired, a test case among outstanding test cases in the target test sequence is loaded into the target test unit.

After acquiring a test result from the target test unit, the test device selects a test case among test cases in the target test sequence that have not been loaded into the target test unit, loads the selected test case into the target test unit and then waits for another test result from the target test unit and so on, until all the test cases in the target test sequence are loaded into the target test unit for execution.

In the second embodiment, one test case is loaded into the test unit at a time and a next test case is loaded only after the execution of the previous test unit is completed. In this way, the execution progress of test cases in each of the multiple first test sequence can be accurately controlled, so that outstanding test cases in all of the multiple first test sequences can be accurately distributed based on the execution progress. Therefore, all the multiple first test sequences can be finished executing at the same time, so as to maximize resources of the test units and maximize the testing efficiency.

Further, a third embodiment of the method for software testing is proposed based on at least one of the first and second embodiments. In the third embodiment, step S30 includes the following sub-steps S301 to S302.

In step S301, it is determined based on the test progress information whether there is a completed sequence among the multiple first test sequences. The number of outstanding test cases in the completed sequence is zero.

In the third embodiment, the outstanding test cases in the multiple first test sequences are distributed based on the test progress information, so that the test units corresponding to the multiple first test sequences finish executing all the multiple first test sequences at the same time. An outstanding test case in a first test sequence is a test case that has not been loaded into a test unit corresponding to the first test sequence for execution.

The test progress information of a first test sequence may be the number of outstanding test cases in the first test sequence, or information for calculating the number of outstanding test cases in the first test sequence. The test device may determine based on the test progress information whether there is a completed sequence among the multiple first test sequences. The completed sequence is a test sequence in which the number of outstanding test cases is zero. A test unit, into which test cases in a first test sequence corresponding to the test unit have all been loaded for execution, executes test cases relatively quickly.

In step S302, if it is determined that there is a completed sequence, a first preset number of outstanding test cases are allocated from an uncompleted sequence among the multiple first test sequences to the completed sequence. The number of outstanding test cases in the uncompleted sequence is greater than a second preset number.

In response to its determination that there is a completed sequence, the test device allocates the first preset number of outstanding test cases from the uncompleted sequence to the completed sequence. The number of outstanding test cases in the uncompleted sequence is greater than the second preset number. The first preset number may be set as required. For example, the first preset number is set to 1, indicating that the test device is to allocate 1 test case from an uncompleted sequence to the completed sequence. The second preset number may also be set as required. For example, the second preset number is set to 1, indicating that part of outstanding test cases in a first test sequence may be allocated to the completed sequence in a case that the first test sequence includes two or more outstanding test cases, so that resources of the test unit corresponding to the completed sequence can be fully used.

In an embodiment, the test device may not distribute outstanding test cases in the multiple first test sequences in response to its determination based on the test progress information that there is no completed sequence. Instead, the test device determines whether there is a completed sequence based on test progress information acquired subsequently.

In an embodiment, the allocation of a test case from an uncompleted sequence to the completed sequence includes allocating a test case located at the end of the uncompleted sequence to the completed sequence.

A fourth embodiment of the method for software testing is further proposed based on at least one of the first, second and third embodiments. In the fourth embodiment, the method further includes the following steps S40 to S70 after step S20.

In step S40, a second test case set for performing a second round of testing on the to-be-tested software is acquired after a first round of testing on the to-be-tested software based on the first test case set is finished.

In the fourth embodiment, multiple rounds of testing are performed on the to-be-tested software based on different test case sets or the same test case set. After finishing the first round of testing on the to-be-tested software based on the first test case set, the test device may acquire a test case set (hereinafter referred to as the second test case set) for performing the second round of testing on the to-be-tested software. The second test case set may be equal to the first test case set, the second and first test case sets may have elements in common, or the second and first test case sets may have no elements in common, which is not limited herein.

In step S50, for each of the multiple test units, a case list of test cases executed by the test unit is acquired after the first round of testing on the to-be-tested software based on the first test case set is finished.

After finishing the first round of testing on the to-be-tested software based on the first test case set, the test device acquires, for each of the multiple test units, the case list of test cases executed by the test unit. The case list reflects which test cases were executed by the test unit.

In step S60, the second test case set is divided based on the multiple case lists to obtain multiple second test sequences.

The test device may divide the second test case set based on the multiple case lists to obtain multiple test sequences (hereinafter referred to as second test sequences). In practice, the division of the second test case set based on the case lists varies with the relationship between the second test case set and the first test case set, and thus is not limited herein. However, the aim is to divide the second test case set based on the final division result of the first test case set, that is, the case lists, in order to minimize the number of modifications to the second test sequences by the test device during the second round of testing, thereby optimizing allocation of resources of the test device and improving testing efficiency.

In step S70, for each of the multiple second test sequences, a test case is loaded from the second test sequence to the test unit corresponding to the second test sequence at the beginning of the second round of testing, so that the multiple test units execute the loaded test cases in parallel.

At the beginning of the second round of testing, the test device loads test cases from the multiple second test sequences to the multiple test units respectively, so that the loaded test cases are executed in parallel by the respective test units.

In an embodiment, step S60 includes the following sub-step S601.

In S601, in a case that the second test case set is equal to the first test case set, test cases executed by the same test unit are allocated, based on the multiple case lists and from the second test case set, to a same test sequence, to obtain the multiple second test sequences.

In a case that the second test case set is equal to the first test case set, the test device allocates, based on the multiple case lists and from the second test case set, test cases executed by the same test unit to the same test sequence, so as to obtain the multiple second test sequences. The test device, during the first round of testing on the to-be-tested software based on the first test case set, modifies the number of test cases in each first test sequence for the purpose of finishing executing the multiple first test sequences at the same time. Therefore, the lists of test cases executed by the respective test units in the first round of testing are considered as an optimal division based on which the second test case set is divided, thereby minimizing the number of modifications to the numbers of test cases in the second test sequences during the second round of testing.

In an embodiment, the test device may further modify the second test sequences in a case that the number of test units involved in the first round of testing is different from the number of test units involved in the second round of testing. For example, the number of test units involved in the second round of testing is larger than the number of test units involved in the first round of testing. The test device may create second test sequences on the basis of the original second test sequences obtained from division so that the number of the second test sequences ultimately obtained is equal to the number of test units involved in the second round of testing, and then allocate part of test cases from the original second test sequences to the created second test sequences. In another example, the number of test units involved in the second round of testing is smaller than the number of test units involved in the first round of testing. The test device may delete second test sequences from the multiple second test sequences obtained from division so that the number of the second test sequences ultimately obtained is equal to the number of test units involved in the second round of testing, and evenly distribute test cases from the deleted second test sequences among the remaining second test sequences.

In an embodiment, step S60 includes the following sub-steps S602 to S603.

In S602, in a case that the second test case set is different from the first test case set, test cases executed by a same test unit, are allocated based on the multiple case lists and from the second test case set, to a same test sequence, to obtain multiple second test sequences corresponding to the multiple test units.

In a case that there are test cases in the second test case set and not in the first test case set, the test device first allocates test cases in both the second test case set and the first test case set based on the case lists, and then allocates test cases in the second test case set and not in the first test case set. The test cases in both the second test case set and the first test case set are allocated based on the case lists, so as to minimize the number of times that the test device modifies the second test sequences during the second round of testing, thereby avoiding the failure of the test device to allocate resources, optimizing the allocation of resources and improving testing efficiency accordingly.

The number of second test sequences obtained from division by the test device may be equal to the number of test units, that is, the second test sequences corresponding to the test units are obtained from division. The test device first allocates test cases in the second test case set that were executed by a same test unit during the first round of testing to a same second test sequence. It should be understood that the second test sequences obtained from division each are a null set in a case that the second and first test case sets have no elements in common.

In S603, test cases in the second test case set and not in the first test case set are distributed among the multiple second test sequences.

After distributing the test cases in the second test case set that are also in the first test case set, the test device distributes the test cases in the second test case set and not in the first test case set among the second test sequences. In practice, test cases in the second test case set but not in the first test case set may be distributed among the second test sequences equally or in other manners, which are not limited herein.

In an embodiment, the method further includes the following steps A10 to A40 after step S20.

In A10, a second test case set for performing a second round of testing on the to-be-tested software is acquired after a first round of testing on the to-be-tested software is finished based on the first test case set.

In A20, an intersection of the second test case set and the first test case set is acquired, and a first total period of time spent on executing all test cases in the intersection in the first round of testing is acquired.

In this embodiment, after finishing the first round of testing based on the first test case set, the test device acquires, for each of the test cases, a period of time spent on executing the test case from the test unit that executes the test case. During the second round of testing, the test device divides, based on the periods of time spent on executing the respective test cases in the first round of testing, the second test case set for the second round of testing, so as to minimize the number of times that the test device modifies the second test sequences during the second round of testing, thereby avoiding the failure of the test device to allocate resources, optimizing the allocation of resources and improving testing efficiency accordingly.

The test device acquires the intersection of the second test case set and the first test case set. That is, the intersection includes test cases in both the first test case set and the second test case set. The test device acquires, for each of the test cases in the intersection, a period of time spent on executing the test case in the first round of testing, and adds the periods of time together to obtain a total period of time (hereinafter referred to as the first total period of time).

In A30, the intersection is divided based on the first total period of time to obtain multiple second test sequences. Among the multiple second test sequences, a second total period of time spent on executing all test cases in one second test sequence is equal to another second total period of time spent on executing all test cases in another second test sequence.

The test device divides the intersection based on the first total period of time to obtain the multiple second test sequences. The number of the multiple second test sequences depends on the number of test units available in the second round of testing, and reference is made to the above determination of the number of first test sequences for details. The division of the intersection is not limited herein, as long as the periods of time spent on executing respective second test sequences (hereinafter referred to as the second total periods of time) are equal. Alternatively, the periods of time spent on executing respective second test sequences are different from each other within a certain range so as to avoid a situation that division of one test case among second test sequences is inevitable in order to equalize the periods of time spent on executing respective second test sequences, thereby ensuring integrity of each test case.

In A40, the test cases in the second test case set and not in the first test case set are distributed among the multiple second test sequences.

After obtaining the multiple second test sequences, the test device distributes the test cases in the second test case set but not in the first test case set among the multiple second test sequences, such that the division of the second test case set is finished. The test cases in the second test case set but not in the first test case set are distributed among the multiple second test sequences evenly or in other manners, which is not limited herein.

Figure 3:
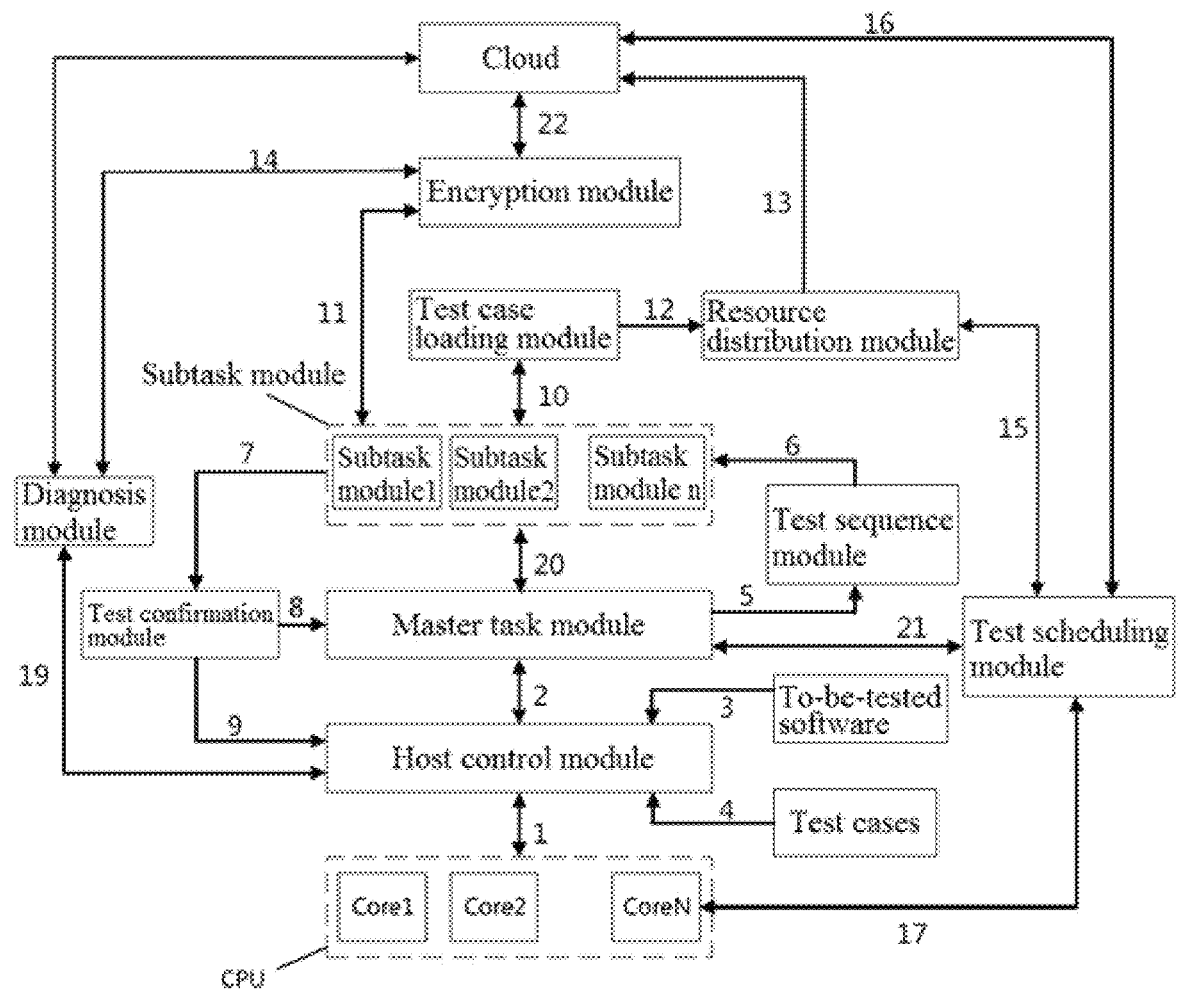
FIG. 3 is a block diagram illustrating an architecture for performing the method for software testing according to an embodiment of the present disclosure.

In an embodiment, the method for software testing according to the present disclosure may be implemented by the architecture as shown in FIG. 3, and details are described below.

Before the software testing by executing test cases in parallel, the tester loads the to-be-tested software into a host control module through step 3 and loads test cases to be executed (the first test case set) into the host control module through step 4. The tester sends a status command requesting the start of the testing to the cloud (cloud server) via the host control module.

The host control module generates a master task module through step 2 on receipt of the status command from the tester. This master task module is configured to schedule the entire testing task, generate of a test report and the like. The master task module generates multiple subtask modules through step 20. The number of subtask modules depends on the maximum number of test channels that the cloud can support operating in parallel, for example, the number of CPUs or CPU cores available in the cloud. Further, the master task module loads all the test cases loaded in the host control module to a test sequence module through step 5. In the test sequence module, the test cases are distributed among multiple test sequences. The number of test sequences is equal to the number of subtask modules. The test sequences are bound to the respective subtask modules through step 6, so that each subtask module includes a test sequence.

After the above operations of the subtask modules, the binding status of test sequences and respective subtask modules is returned to a test confirmation module through step 7 and then is fed back to the master task module through step 8, for the master task module to determine integrity of the test sequences allocated to the respective subtask modules (that is, whether the number of test cases in all the test sequences is equal to the total number of test cases) and to determine whether each subtask module includes a corresponding test sequence. The subtask module provides feedback to the host control module through step 9 to inform the tester of the current testing progress.

In response to its positive determination, the master task module sends to the subtask modules a status instruction for starting the testing through step 20. On receipt of the instruction, each subtask module sends its test sequence to the test case loading module through step 10. The status of the test sequence of each subtask module maintains unchanged in the test case loading module, that is, the subtask modules correspond to respective test sequences. The test case loading module returns confirmation status information to the subtask modules, and the test sequences are to be loaded into the cloud for execution in parallel.

On receipt of the confirmation status information from the test case loading module, each subtask module sends corresponding handshake protocol information to the encryption module through step 11. The encryption module feeds, on receipt of the handshake protocol information, the handshake protocol information back to the cloud through step 22. The cloud sends handshake protocol information to the encryption module. In a case that the handshake protocol information received from the cloud is identical to the handshake protocol information received from the subtask module, the handshake between the subtask module and the cloud is successful, the test sequence corresponding to the subtask module is transmitted to the cloud for parallel execution, and information such as servers available on the cloud is fed back to the subtask module. In a case that the handshake protocol information received from the cloud is different from the handshake protocol information received from the subtask module, the encryption module feeds information indicating unsuccessful "handshake" (for example, a fault code) to a diagnostic module through step 14. The diagnostic module performs a diagnosis based on the information indicating unsuccessful "handshake" from the encryption module and attempts to analyze the cause of the fault (for example, by searching a fault manual for the fault code) and feeds the cause of the fault to the host control module through step 19, for the tester to decide whether to resume the handshake with the cloud.

In response to a successful handshake from a subtask module and on receipt of information about the available servers on the cloud, the test case loading module loads some test sequences to the resource distribution module and provides the available server resources in the cloud to the resource distribution module through step 12. The resource distribution module matches the test sequences and the available server resources in the cloud and provides test cases to the cloud in a queue for parallel execution through step 13. The test sequences are executed on respective CPUs or respective cores of the same CPU of an available server in the cloud. For each of the test sequence, the resource distribution module provides, only when a test case in the test sequence is finished executing on a CPU or CPU core corresponding to the test sequence, a next test case in the test sequence to the cloud for the testing.

The resource distribution module feeds cloud test case execution status to a test scheduling module through step 15 in real time. The test scheduling module feeds the cloud test case execution status to the master task module. The master task module allocates, based on the cloud test case execution status such as the periods of time spent on executing respective test sequences, or the numbers or percentages of test cases have been executed in respective test sequences, cloud test resources in real time, for example, allocating a test case from a test sequence executed slowly to a test sequence executed fast, and feeds the allocation result back to the test scheduling module through step 21. The test scheduling module feeds the allocation result back to the resource distribution module through step 15, so as to modify the distribution of test cases among test sequences.

Further, the test scheduling module feeds the modified distribution back to the cloud through step 16 for confirmation.

In a case that the cloud fails, for example, "handshake" between the local and the cloud fails several times, or in a case that a server in the cloud fails, the master task module controls a test scheduling module through step 21. The test scheduling module then requests, through step 15, the resource distribution module to download a test sequence. The resource scheduling module sends the test sequence to the test scheduling module through step 15. The test scheduling module matches the test sequences and cores of a local CPU based on the number of cores of the local CPU, and then loads the test sequences to the local CPU through step 17 for parallel execution. The test sequences are executed in parallel at the local CPU with the same details as the test sequences are executed in parallel in the cloud. That is, the master task module allocates test resources of the cores of the local CPU in real time based on the test sequence execution status at the local CPU. The local CPU, when executing the test sequences in parallel abnormally, directly feeds the abnormal status back to the host control module through step 1.

When all the test sequences are finished executing at the cloud, the cloud feeds the test result back to the test scheduling module through step 16. The test scheduling module feeds the test result back to the master task module through step 21. The master task module feeds the test result back to the host control module through step 2 after confirming the test integrity, and controls the subtask module to disconnect from the cloud through step 20. When all the test sequences are finished executing at the local CPU, the local CPU feeds the test result to the test scheduling module through step 17. The testing scheduler module feeds the test result back to the master task module through step 21. The master task module, after confirming the test integrity, feeds the test result back to the host control module through step 2.

The master task module is capable of to self-learning. In a case that a test case set in the next round is equal to a test case set completed in the current round, the master task module distributes test cases among the subtask modules based on the optimal solution in the current round. In a case that the test case set in the next round is different from the test case set completed in the current round, the master task module first distributes test cases, in the test case set in the next round that are also in the test case set completed in the current round, among the subtask modules based on the optimal solution in the current round, and then equally distributes test cases, in the test case set in the next round but not in the test case set completed in the current round, among the subtask modules. Further, the task module modifies newly added test cases in real time during the testing as described above.

The method for software testing by executing test cases via multiple channels in parallel according to the present disclosure has the following advantages compared with the existing method for software testing by executing test cases serially. First, through rational allocation of test sequences and effective utilization of CPU resources, test cases that are executed at the same time can be maximized, thereby greatly improving testing efficiency. Second, the testing may be performed on a cloud server, thereby greatly reducing demands for testing resources on local testing hardware. The tester may carry out the testing work anytime, anywhere. Further, the testing can also be performed in the local computer when the cloud server fails, which is highly flexible. Finally, the master task module is capable of self-learning, and thus learns from the completion of each round of testing. Therefore, the master task module optimizes and reasonably distributes test sequences based on the completion status of the previous round of testing in a next round of testing, thereby further improving the testing efficiency.

Figure 4:
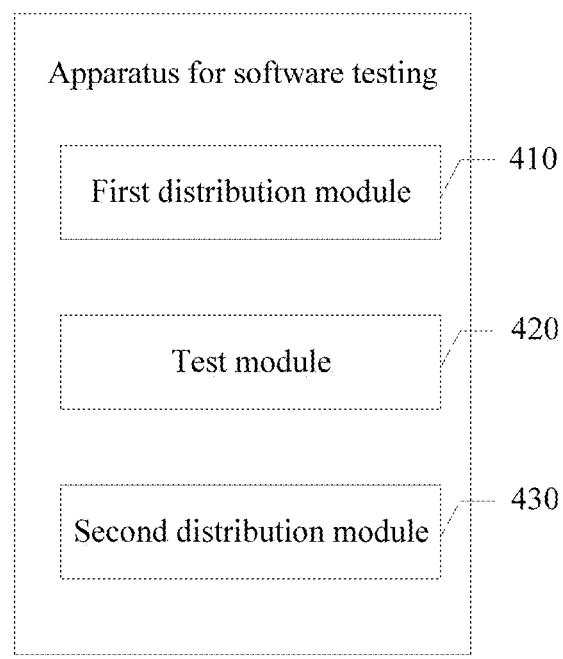
FIG. 4 is a block diagram illustrating functional modules of an apparatus for software testing according to an embodiment of the present disclosure.

In addition, an apparatus for software testing is proposed according to an embodiment of the present disclosure. Referring to FIG. 4, the apparatus for software testing includes a first distribution module 410, a test module 420 and a second distribution module 430.

The first distribution module 410 is configured to acquire a first test case set for to-be-tested software, and divide the first test case set into multiple first test sequences.

The test module 420 is configured to load, for each of the multiple first test sequences, a test case from the first test sequence to a test unit corresponding to the first test sequence at the beginning of the software testing, to execute the loaded test cases by multiple test units in parallel.

The second distribution module 430 is configured to, during the software testing, acquire test progress information of the multiple first test sequences, and distribute outstanding test cases in the multiple first test sequences based on the acquired test progress information to modify the numbers of test cases in the respective first test sequences. The outstanding test case is a test case to be loaded into a corresponding test unit for execution.

Further, the test module 420 includes an acquisition unit, and a loading unit.

The acquisition unit is configured to acquire, for a target test sequence among the multiple first test sequences, a test result of the target test unit corresponding to the target test sequence after one test case from the target test sequence is loaded into the target test unit each time.

The loading unit is configured to load, after the test result of the target test unit is acquired, a test case among outstanding test cases from the target test sequence into the target test unit.

Further, the second allocation module 30 includes a determination unit and an allocation unit.

The determination unit is configured to determine, based on the test progress information, whether there is a completed sequence among the multiple first test sequences. The number of outstanding test cases in the completed sequence is zero.

The allocation unit is configured to allocate, if it is determined that there is a completed sequence, a first preset number of outstanding test cases from an uncompleted sequence among the multiple first test sequences to the completed sequence. The number of outstanding test cases in the uncompleted sequence is greater than a second preset number.

Further, the apparatus for software testing may include a first acquisition module, and a second acquisition module.

The first acquisition module is configured to acquire a second test case set for performing a second round of testing on the to-be-tested software after a first round of testing on the to-be-tested software based on the first test case set is finished.

The second acquisition module is configured to acquire, for each of the multiple test units, a case list of test cases executed by the test unit after the first round of testing on the to-be-tested software based on the first test case set is finished.

The first distribution module 410 is further configured to divide the second test case set based on the multiple case lists to obtain multiple second test sequences.

The test module 420 is further configured to load, for each of the multiple second test sequences, a test case from the second test sequence to the test unit corresponding to the second test sequence at the beginning of the second round of testing, to execute the loaded test cases by the multiple test units in parallel.

Further, the first distribution module 410 is configured to, in a case that the second test case set is equal to the first test case set, allocate, based on the multiple case lists and from the second test case set, test cases executed by a same test unit to a same test sequence, to obtain the multiple second test sequences.

Further, the first distribution module 410 is configured to, in a case that there are test cases in the second test case set and not in the first test case set, allocate, based on the multiple case lists and from the second test case set, test cases executed by a same test unit to a same test sequence, to obtain the multiple second test sequences corresponding to the multiple test units; and distribute test cases in the second test case set and not in the first test case set among the multiple second test sequences.

Further, the apparatus for software testing may include a third acquisition module and a fourth acquisition module.

The third acquisition module is configured to acquire a second test case set for performing a second round of testing on the to-be-tested software after a first round of testing on the to-be-tested software based on the first test case set is finished.

The fourth acquisition module is configured to acquire an intersection of the second test case set and the first test case set, and acquire a first total period of time spent on executing all test cases in the intersection in the first round of testing.

The first distribution module 410 is further configured to divide the intersection based on the first total period of time, to obtain multiple second test sequences. Among the multiple second test sequences, a second total period of time spent on executing all test cases in one second test sequence is equal to another second total period of time spent on executing all test cases in another second test sequence. The first distribution module 10 is further configured to distribute test cases in the second test case set and not in the first test case set among the multiple second test sequences.

The first distribution module 410 is further configured to; acquire the number of the multiple test units; and divide the first test case set into the multiple first test sequences, where the number of the multiple first test sequences is equal to the number of the multiple test units.

Further, the apparatus for software testing may include a determination module.

The determination module is configured to determine different CPUs or different cores of a same CPU in a server as the multiple test units in response to success in connecting to the server; and determine different CPUs or different cores of a same local CPU as the multiple test units in response to failure in connecting to the server.

Further details in embodiments of the apparatus for software testing according to the present disclosure are substantially the same as that in the above embodiments of the method for software testing, and thus are not described here.

In addition, a computer-readable storage medium is provided according to an embodiment of the present disclosure. The computer-readable storage medium stores a software testing program that, when executed by a processor, implements the method for software testing.

Details in embodiments of the device for software testing and the computer-readable storage medium of the present disclosure may refer to the embodiments of the method for software testing, and thus are not described here.

It should be noted that the terms "including", "comprising" or any other variant thereof used herein are intended to be non-exclusive inclusion. A process, method, article or apparatus including a series of elements includes not only those elements, but also other elements not expressly listed, or elements inherent to the process, method, article or apparatus. Without further limitation, the fact that an element is qualified by the statement "including a . . . " does not exclude the existence of another identical element in the process, method, article or apparatus that includes the element.

The serial numbers of embodiments of the present disclosure are for descriptive purposes only and does not imply the merit of the embodiments.

From the description of the above embodiments, it is clear to those skilled in the art that the method in the above embodiments may be implemented by software plus necessary common hardware platform or implemented by hardware. However, the method is preferably implemented by software plus necessary common hardware platform in most cases. Based on this understanding, the technical solution of the present disclosure, which essentially or rather contributes to the existing solution, may be embodied in the form of a software product. The computer software product is stored in a storage medium (for example, a ROM/RAM, a diskette, and a CD-ROM) and includes various instructions to instruct a terminal device (such as a mobile phone, a computer, a server, an air conditioner, or a network device) to perform the method according to the present disclosure.

Only preferred embodiments of the present disclosure are described herein with no limitation on the scope of protection for the present disclosure. Any equivalent structure or process from the specification and the drawings of the present disclosure, or direct or indirect application in other related fields, is equally covered by the scope of protection of the of the present disclosure.

The invention claimed is:

1. A method for software testing, comprising:
    acquiring a first test case set for to-be-tested software, and dividing the first test case set into a plurality of first test sequences;
    loading, for each first test sequence of the plurality of first test sequences, a test case from the first test sequence to a test unit corresponding to the first test sequence at the beginning of the software testing, to execute the loaded test cases by the plurality of test units in parallel; and
    during the software testing, acquiring test progress information of the plurality of first test sequences, and distributing outstanding test cases in the plurality of first test sequences based on the acquired test progress information to modify the numbers of test cases in the respective first test sequences, wherein the outstanding test case is a test case to be loaded into a corresponding test unit for execution,
    wherein the method further comprising:
    after the loading, for each of the plurality of first test sequences, a test case from the first test sequence to a test unit corresponding to the first test sequence at the beginning of the software testing, to execute the loaded test cases by a plurality of test units in parallel,
    acquiring a second test case set for performing a second round of testing on the to-be-tested software after finishing a first round of testing on the to-be-tested software based on the first test case set;
acquiring, for each of the plurality of test units, a case list of test cases executed by the test unit after finishing the first round of testing on the to-be-tested software based on the first test case set;
dividing the second test case set based on the plurality of case lists to obtain a plurality of second test sequences; and
loading, for each of the plurality of second test sequences, a test case from the second test sequence to the test unit corresponding to the second test sequence at the beginning of the second round of testing, to execute the loaded test cases by the plurality of test units in parallel.

2. The method for software testing according to claim 1, wherein for a target test sequence among the plurality of first test sequences, the loading a test case from the target test sequence into a target test unit corresponding to the target test sequence comprises:
acquiring a test result of the target test unit after each time one test case from the target test sequence is loaded into the target test unit; and
loading a test case among the outstanding test cases from the target test sequence into the target test unit.

3. The method for software testing according to claim 1, wherein the distributing outstanding test cases in the plurality of first test sequences based on the acquired test progress information comprises:
determining, based on the test progress information, whether there is a completed sequence among the plurality of first test sequences, wherein the number of outstanding test cases in the completed sequence is zero; and
allocating, if it is determined that there is a completed sequence, a first preset number of outstanding test cases from an uncompleted sequence among the plurality of first test sequences to the completed sequence, wherein the number of outstanding test cases in the uncompleted sequence is greater than a second preset number.

4. The method for software testing according to claim 1, wherein the dividing the second test case set based on the plurality of case lists to obtain a plurality of second test sequences comprises:
in a case that the second test case set is equal to the first test case set, allocating, based on the plurality of case lists and from the second test case set, test cases executed by a same test unit to a same test sequence, to obtain the plurality of second test sequences.

5. The method for software testing according to claim 1, wherein the dividing the second test case set based on the plurality of case lists to obtain a plurality of second test sequences comprises:
in a case that there are test cases in the second test case set and not in the first test case set, allocating, based on the plurality of case lists and from the second test case set, test cases executed by a same test unit to a same test sequence, to obtain the plurality of second test sequences corresponding to the plurality of test units; and distributing test cases in the second test case set and not in the first test case set among the plurality of second test sequences.

6. The method for software testing according to claim 1, further comprising:
after the loading, for each of the plurality of first test sequences, a test case from the first test sequence to a test unit corresponding to the first test sequence at the beginning of the software testing, to execute the loaded test cases by a plurality of test units in parallel,
acquiring a second test case set for performing a second round of testing on the to-be-tested software after finishing a first round of testing on the to-be-tested software based on the first test case set;
acquiring an intersection of the second test case set and the first test case set, and acquiring a first total period of time spent on executing all test cases in the intersection in the first round of testing;
dividing the intersection based on the first total period of time to obtain a plurality of second test sequences, wherein among the plurality of second test sequences, a second total period of time spent on executing all test cases in one second test sequence is equal to another second total period of time spent on executing all test cases in another second test sequence; and
distributing test cases in the second test case set and not in the first test case set among the plurality of second test sequences.

7. The method for software testing according to claim 1, wherein the dividing the first test case set into a plurality of first test sequences comprises:
acquiring the number of the plurality of test units; and
dividing the first test case set into the plurality of first test sequences, wherein the number of the plurality of first test sequences is equal to the number of the plurality of test units.

8. The method for software testing according to claim 1, further comprising:
before the loading, for each of the plurality of first test sequences, a test case from the first test sequence to a test unit corresponding to the first test sequence, determining different CPUs or different cores of a same CPU in a server as the plurality of test units in response to success in connecting to the server; and
determining different CPUs or different cores of a same local CPU in local as the plurality of test units in response to failure in connecting to the server.

9. The method for software testing according to claim 2, further comprising:
before the loading, for each of the plurality of first test sequences, a test case from the first test sequence to a test unit corresponding to the first test sequence,
determining different CPUs or different cores of a same CPU in a server as the plurality of test units in response to success in connecting to the server; and
determining different CPUs or different cores of a same local CPU as the plurality of test units in response to failure in connecting to the server.

10. The method for software testing according to claim 3, further comprising:
before the loading, for each of the plurality of first test sequences, a test case from the first test sequence to a test unit corresponding to the first test sequence,
determining different CPUs or different cores of a same CPU in a server as the plurality of test units in response to success in connecting to the server; and
determining different CPUs or different cores of a same local CPU as the plurality of test units in response to failure in connecting the server.

11. The method for software testing according to claim 4, further comprising:
before the loading, for each of the plurality of first test sequences, a test case from the first test sequence to a test unit corresponding to the first test sequence, determining different CPUs or different cores of a same CPU in a server as the plurality of test units in response to success in connecting to the server; and determining different CPUs or different cores of a same local CPU as the plurality of test units in response to failure in connecting the server.

12. The method for software testing according to claim 5, further comprising:

before the loading, for each of the plurality of first test sequences, a test case from the first test sequence to a test unit corresponding to the first test sequence, determining different CPUs or different cores of a same CPU in a server as the plurality of test units in response to success in connecting to the server; and determining different CPUs or different cores of a same local CPU as the plurality of test units in response to failure in connecting the server.

13. The method for software testing according to claim 6, further comprising:

before the loading, for each of the plurality of first test sequences, a test case from the first test sequence to a test unit corresponding to the first test sequence, determining different CPUs or different cores of a same CPU in a server as the plurality of test units in response to success in connecting to the server; and determining different CPUs or different cores of a same local CPU as the plurality of test units in response to failure in connecting the server.

14. The method for software testing according to claim 7, further comprising:

before the loading, for each of the plurality of first test sequences, a test case from the first test sequence to a test unit corresponding to the first test sequence, determining different CPUs or different cores of a same CPU in a server as the plurality of test units in response to success in connecting to the server; and determining different CPUs or different cores of a same local CPU as the plurality of test units in response to failure in connecting the server.

15. A device for software testing, comprising:

a memory;

a processor; and a software testing program stored on the memory and executable by the processor, wherein the software testing program, when executed by the processor, implements the method for software testing according claim 1.

16. A non-transitory computer-readable storage medium, wherein the computer-readable storage medium stores a software testing program that, when executed by a processor, implements the method for software testing according to claim 1.

* * * * *